Oct. 13, 1964

J. E. GLUCK ETAL 3,153,112

OPTICAL ALIGNMENT DEVICE FOR VIEWING
OPPOSITE SIDES OF A TEST ELEMENT
Filed April 20, 1961

INVENTORS.
JEROME E. GLUCK
CARTER C. A. WELLS
BY George C. Sullivan
Agent

United States Patent Office 3,153,112
Patented Oct. 13, 1964

3,153,112

OPTICAL ALIGNMENT DEVICE FOR VIEWING OPPOSITE SIDES OF A TEST ELEMENT

Jerome E. Gluck, Santa Clara, and Carter C. A. Wells, Palo Alto, Calif., assignors to Lockheed Aircraft Corporation, Burbank, Calif.

Filed Apr. 20, 1961, Ser. No. 104,333
3 Claims. (Cl. 88—14)

This invention relates to a device for detecting misalignment and more particularly to an optical device for detecting misalignment of indicia located on opposite sides of opaque material.

The herein defined film indicia and corresponding printed circuit indicia are hereinafter referred to as target indicia, and the indicia of the misalignment detecting device is hereinafter referred to as reference indicia.

In the art of printed circuit boards, one of the primary difficulties is that of maintaining front to back alignment of target indicia which are located on opposite sides of a dielectric board which is generally made of opaque material. A typical process by which printed circuit boards of the above type are made is as follows: Initially large scale models of the front and back circuits are produced and then photographs of these models are made which result in front and back negatives of reduced size which correspond to the actual size of the printed circuit board. These negatives are then placed in facial contact and the corresponding target indicia, for example, circles having a diameter of about fifty thousandths of an inch, are aligned as nearly as possible by eye or magnifying devices. After being aligned in this manner, two or three of the outer edges are taped together in an attempt to maintain fixed alignment. Generally, the base material from which the printed circuit is formed consists of a laminated three-layer sheet consisting of two outer copper sheets separated by a dielectric sheet wherein the exterior surfaces of each copper sheet is coated with a light-sensitive, acid-resistant emulsion. This three-layer sheet is inserted between the two negatives and light is then impinged on both negatives which exposes both emulsified surfaces of the three-year sheet in areas immediately adjacent the light transmitting areas of the films. The exposed three-layer sheet is then removed and subjected to a developing process which removes all emulsion which was exposed to light and leaving exposed copper at those areas where the emulsion was thus removed.

The normal procedure at this point is to remove the exposed copper by an acid etching process and determine misalignment by drilling holes at the target indicia. In general, if the target indicia holes have a diameter of about .050 inch, the necessary tolerance is about ± .005 inch. Since the target indicia of the taped negative frequently become misaligned by more than ± .005 inch, due to film slippage for example, it can be readily seen that hole drilling is a destruction test for determining the alignment of the target indicia.

It is recognized there are other methods employing comparative microscope devices for determining misalignment of target indicia. However, these comparative microscope devices are expensive, necessitate very fine adjustments to obtain exact focus, and consume considerable time for proper operation. This latter factor is especially important in production work and consequently these devices have not found wide acceptance in printed circuit operations.

The present invention obviates the disadvantages of these prior schemes by employing a nondestructive method for detecting misalignment which incorporates a device that is inexpensive to manufacture, requires very little time for proper operation and realizes exact focus by only one very simple manipulation. The destruction test is obviated by following the above described procedure up to but excluding the acid etching process. That is, after the three-layer sheet has been subjected to the developing process, the exterior emulsion areas are dyed to provide a sharp contrast between the emulsion areas and the exposed copper areas. When sufficient contrast is obtained, misalignment is detected by utilizing the optical devices of the present invention.

The hereinafter described device is capable of readily detecting misalignment of only ± .001 inch and is accomplished by a simple operation the performance of which consumes very little time. In addition, parallax and image distortion are reduced to a minimum since the focal points of the two optical systems are always on their respective reference indicia and these reference indicia are always in facial contact with the respective target indicia on the material being tested.

Accordingly, an object of the present invention is to provide an inexpensive, accurate, easily manipulated misalignment detection device.

Another object of the present invention is to provide a device which is capable of detecting misalignment of a two-sided printed circuit board.

Still another object of the present invention is to provide a device which is capable of detecting misalignment of target indicia on opposite sides of an opaque board.

A further object of the present invention is to provide a misalignment detecting device which may be rapidly adjusted to have the reference indicia thereof in contact with material the alignment of which is to be detected.

A still further object of the present invention is to provide an optical misalignment detection device which has very litle parallax and/or distortion.

The specific nature of the invention, as well as other objects, uses and advantages thereof, will clearly appear from the following description and from the accompanying drawing in which.

Like numerals designate like elements throughout the figures of the drawing.

Figure 1:
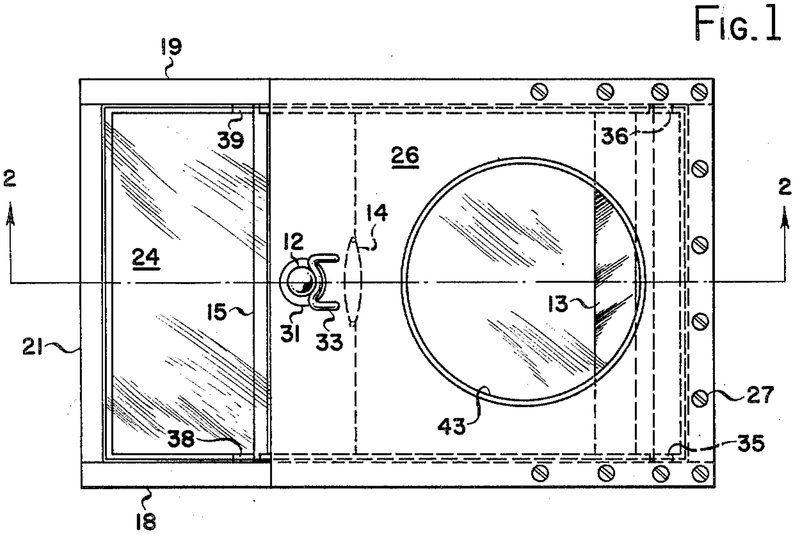
FIGURE 1 is a top elevation of the misalignment detecting device of the present invention.
Figure 2:
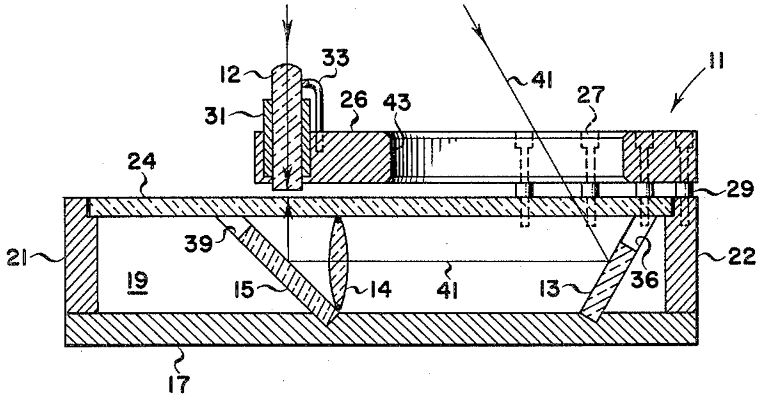
FIGURE 2 is a cross-sectional view of the device of the present invention taken at section 2—2 of FIGURE 1.

In FIGURES 1 and 2 is illustrated a constructional example of a device according to the present invention. This device generally consists of frame 11, adjustable lens 12, mirror 13, lens 14 and mirror 15. Frame 11 includes base member 17, upon which side members 18 and 19, and end members 21 and 22 are mounted. Mounted upon these side and end members is plate 24 the details and function of which will be hereinafter described. Lens support member 26 is operatively connected to side members 18 and 19 and end member 22 by means of a plurality of bolts 27 or other fastening means. Plate 24 and member 26 are maintained parallel and in spaced relation by means of a plurality of washers 29 or similar spacing members through which bolts 27 are inserted. In order to provide lateral and longitudinal adjustment for alignment of the hereinafter described reference indicia, the holes in member 26, through which bolts 27 are inserted, have a diameter somewhat larger than the shank of bolts 27. As shown in FIGURES 1 and 2, plate 24 is mounted in recesses formed along the upper inner edges of the side and end members and is rigidly held in place as by means of cement, screws (not shown) or the like. It is to be understood, however, that plate 24 may be mounted directly on top of these end and side members and have openings therein through which bolts 17 are inserted. These openings may be made larger than the shank of the bolts 27 to provide for lateral and longitudinal adjustment of plate 24 and the associated hereinafter described reference indicium.

Figure 3:
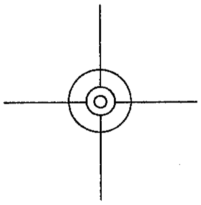
FIGURE 3 is an enlarged illustration of one type of configuration that may be employed for the upper and lower reference indicia of the present invention.

Cylindrical housing 31 is mounted on the end of member 26 such that the longitudinal axis thereof is normal to the plane of plate 24. Lens 12 is cylindrical and in slidably and rotatably mounted within housing 31. The tolerance between the cylindrical surface of lens 12 and housing 31 is preferably small so the longitudinal axis of the lens will remain coincident with the longitudinal axis of the housing and therefore normal to the plane of plate 24. The upper end of lens 12 is convex and has a magnification factor of about ten. It is to be understood that considerable departure from this magnification factor may be made and still remain within the scope of the present invention. The lower surface of lens 12 is flat and parallel to the plane of plate 24 and has reference indicium thereon which may be formed by an etching, scribing, dying or similar process. Many different reference indicium configurations may be employed; however, when the device is used to align circular target indicia, it is preferable that the lens reference indicium comprise circles of increasing diameter bisected by perpendicular straight lines as shown in FIGURE 3. The convex surface of lens 12 is selected to focus on the reference indicium on the bottom flat surface thereof. It will be noted that the cylindrical light transmitting material between the convex and flat surfaces of lens 12 serves to always maintain the reference indicium at the correct distance from the concave surface and to provide support irrespective of its vertical position. It is to be understood this fixed spacing could be accomplished in various ways, for example, by attaching a lens and reference indicium respectively to opposite ends of a hollow cylinder. Unless a restraining force is provided, lens 12 would move downwardly by only the force of gravity. To prevent this free movement, frictional drag may be provided by reducing the tolerance between the lens and housing or a bias device, such as wire clip 33, may be applied against the cylindrical surface thereof.

Plate 24 is preferably made of light transmitting material and has reference indicium on the upper surface thereof. This reference indicium may be formed in the same manner as was the previously described reference indicium or it may be formed on a light transmitting film, plastic, for example, and attached to the upper surface of plate 24. In the alternative, an opening or hole may be formed in plate 24, opposite the flat surface of lens 12, and the reference indicium, which may be made of wire, attached to this opening in the plane of the upper surface of plate 24. This reference indicium is preferably of the same configuration and size as the reference indicium on the flat surface of lens 12 and is in axial alignment therewith. Exact axial alignment of these two reference indicia is obtained by loosening bolts 27 and adjusting member 26 and then tightening bolts 27 in place. If desired, this adjustment could also be accomplished by adjusting plate 24 in the manner previously explained.

As best depicted in FIGURE 2, mirror 13 is mounted in slots 35 and 36 and mirror 15 is mounted in slots 38 and 39 of side members 18 and 19. The slots for mirrors 13 and 15 are formed at angles of about 30° and 45°, respectively, with respect to vertical. However, there may be considerable departure from these angles depending upon the position from which viewing is desired. It is preferable that mirror 13, as well as mirror 15, have front reflecting surfaces to reduce distortion which would otherwise be introduced by the mirror light transmitting material if back reflecting surfaces were employed. It is to be understood that various sized mirrors and various types of optical reflecting devices could be employed which could be mounted by a plurality of different methods and still remain within the scope of the present invention.

Lens 14 has the focal point thereof on the reference indicium on the upper surface of plate 24 and has a magnification factor about the same as lens 12. It is mounted with the axis thereof coincident with the line of sight indicated by solid line 41. It is to be understood that lens 14 could be mounted at any of a plurality of positions along this line of sight; however, it is preferable that it be mounted adjacent mirror 15, as shown, since this tends to reduce parallax and distortion. An opening 43 is provided in member 26 to eliminate distortion which would otherwise be introduced if it were necessary to view through the transparent material from which member 26 is formed. Likewise, an opening (not shown) may be provided along line of sight line 41 in plate 24 in order to reduce parallax and distortion.

It is to be understood that frame 11 could be made entirely of opaque material; however, it is preferable that it be made of light transmitting material. When made of light transmitting material, ambient light may be sufficient to provide adequate illumination of the reference indicium on the upper surface of plate 24, as well as the target indicium on lower surface of the material being tested. A separate light source may be employed to provide additional illumination and may be mounted within or exterior of frame 11.

In view of the foregoing it can be readily seen that a device is provided for detecting misalignment that has the reference indicia thereof in facial contact with the target indicia of the material being tested and thereby reduces parallax and distortion to a minimum. In addition, the slidable feature of lens 12 permits receipt of printed circuit boards of varying thicknesses and the rotatable feature of lens 12 considerably aids in alignment when the indicia of the tested material has straight lines. Furthermore, since the target and reference indicia are in facial contact, an acceptable image may be viewed from about ±10° from line of sight line 41 shown in FIGURE 1. This makes it possible to align the upper target indicium and the reference indicium of lens 12 and then quickly and accurately determine whether the lower target indicium is aligned with the reference indicium on plate 24 by merely shifting the viewing position to within about ±10° of line of sight line 41. It should be noted that the cantilever mounting of member 26 permits a wide variety of width and length boards to be tested by this device and that approximate alignment of the board is easily realized by viewing through transparent member 26 and then obtaining precise alignment by viewing through lens 12.

Another use which is considered to be within the scope of the present invention is in those situations where it is desirable to detect the correct position of target indicia that are defined by non parallel planes. In this situation either lens 12 and/or plate 24 may be adjusted so the planes defined by the reference indicia are parallel to the corresponding planes defined by the target indicia. In this manner facial contact between the reference and target indicia would be realized which effectively eliminates parallax and distortion.

It is to be understood in connection with this invention that the embodiment shown is only exemplary, and that various modifications can be made in construction and arrangement within the scope of the invention as defined in the appended claims.

What is claimed is:

1. A device for detecting the misalignment of first and second target indicia disposed on opposites sides of a test element including a frame, said frame including a plate and a lens support member, means for maintaining said plate and lens support member in spaced relation, a lens device, means for slidably and rotatably mounting said lens device on said lens support member with the longitudinal axis of the line of sight of said lens device being about normal to the plane surface of said plate, the lower end of said lens device having a first reference indicium that defines a plane about parallel to said plane surface of said plate, the upper plane surface of said plate having a second reference indicium positioned in axial alignment with the line of sight of said lens device, optical elements mounted on said frame and below said plate to permit viewing the lower surface of said second reference indicium from a position above said lens support member and said lens device, said first reference indicium being in facial contact with said first target indicium of said test element and said second reference indicium being in facial contact with said second target indicium of said test element when a test element is disposed between said plate and lens support means thereby detecting misalignment between said first and second target indicia of said test element.

2. The device of claim 1 wherein said lens device includes a lens mounted in fixed spaced relation above said first reference indicium and having a focal point on said first reference indicium and said optical elements include a lens mounted in fixed spaced relation from said second reference indicium and having a focal point on said second reference indicium.

3. The device of claim 1 wherein said optical elements comprise first and second mirrors and a lens, said first mirror mounted at the rear of said frame and at a clockwise angle from the vertical, said second mirror mounted on said frame under said second reference indicium and at a counterclockwise angle from the vertical and said lens mounted on said frame between said first and second mirrors.

References Cited in the file of this patent

UNITED STATES PATENTS

| | | |
|---|---|---|
| 2,129,130 | Hammer | Sept. 6, 1938 |
| 2,747,284 | Christoph | May 29, 1956 |
| 3,107,168 | Hogan et al. | Oct. 15, 1963 |

FOREIGN PATENTS

| | | |
|---|---|---|
| 792,662 | Great Britain | Apr. 2, 1958 |

OTHER REFERENCES

Optical Arrangement for Inspection of Alignment of Transistor Elements, RCA Technical Notes, published by Radio Corporation of America, RCA TN No. 82.